US011964307B2

(12) United States Patent
Beauvais

(10) Patent No.: US 11,964,307 B2
(45) Date of Patent: Apr. 23, 2024

(54) PORTABLE SHOWER CLEANING APPARATUS

(71) Applicant: Joseph Beauvais, Clinton, CT (US)

(72) Inventor: Joseph Beauvais, Clinton, CT (US)

( * ) Notice: Subject to any disclaimer, the term of this patent is extended or adjusted under 35 U.S.C. 154(b) by 292 days.

(21) Appl. No.: 17/459,299

(22) Filed: Aug. 27, 2021

(65) Prior Publication Data

US 2022/0234080 A1 Jul. 28, 2022

Related U.S. Application Data

(63) Continuation-in-part of application No. 17/160,336, filed on Jan. 27, 2021.

(51) Int. Cl.

*A47L 13/26* (2006.01)
*B05B 7/00* (2006.01)
*B05B 7/24* (2006.01)
*B05B 9/00* (2006.01)
*B05B 9/04* (2006.01)
*B08B 3/02* (2006.01)

(52) U.S. Cl.

CPC .............. *B08B 3/028* (2013.01); *A47L 13/26* (2013.01); *B05B 7/0018* (2013.01); *B05B 7/0093* (2013.01); *B05B 7/244* (2013.01); *B05B 9/0403* (2013.01); *B05B 9/007* (2013.01)

(58) Field of Classification Search

None

See application file for complete search history.

(56) References Cited

U.S. PATENT DOCUMENTS

2006/0174842 A1* 8/2006 Bond ...................... B08B 3/028 119/664

* cited by examiner

*Primary Examiner* — Levon J Shahinian

(74) *Attorney, Agent, or Firm* — CANTOR COLBURN LLP; Steven M. McHugh

(57) ABSTRACT

A portable shower cleaning article is provided and includes a first container, wherein the first container defines a first container cavity for containing a rinsing fluid and a pump, wherein the pump is associated with the first container cavity. The portable shower cleaning article further includes a dispensing hose, wherein the dispensing hose includes a hose input end communicated with a hose output end via a hose cavity and a trigger valve, wherein the trigger valve is associated with the hose output end and defines a trigger valve input end communicated with a trigger valve output end via a trigger valve flow cavity, wherein the hose input end is associated with the pump, and wherein the pump is configured to pump the rinsing fluid through the hose cavity and into the trigger valve flow cavity.

20 Claims, 4 Drawing Sheets

PORTABLE SHOWER CLEANING APPARATUS

CROSS-REFERENCE TO RELATED APPLICATIONS

This application is a Continuation-In-Part application of U.S. Non-Provisional patent application Ser. No. 17/160,336 and claims the benefit of priority of the filing date of Continuation-In-Part application of U.S. Non-Provisional patent application Ser. No. 17/160,336 filed Jan. 27, 2021 which claims the benefit of priority of the filing date of U.S. Provisional Patent Application Ser. No. 62/966,396 filed Jan. 27, 2020, the contents of both of which are incorporated herein by reference in their entireties.

FIELD OF THE INVENTION

The present invention relates to cleaning apparatus and more particularly to a portable cleaning apparatus for showers and other areas that are prone to getting wet and retaining fluids.

BACKGROUND OF THE INVENTION

Areas that are meant to deal with water, such as showers, kitchens, pools, hot tubs, etc. typically retain a portion of the water on its surfaces after use. This is especially true for commercial kitchens, such as in a restaurant, and bathrooms, such as in a workout facility, which handle large volumes of water and other fluids. As such, because a wet, damp environment is ripe for the growth of soap scum, mold, mildew and other bacteria that can have deleterious health effects on people using these facilities, it is imperative that these areas are cleaned well and disinfected correctly. In fact, for some commercial areas, professional cleaners may be required to ensure that the area is completely cleaned and/or disinfected.

In general, to adequately clean wet areas (such as a shower stall, bathroom, kitchen, etc.) multiple steps are typically used. The first step involves dispensing a cleaning fluid/liquid onto the surface or area that needs to be cleaned. This is usually accomplished via one or more spray bottles which contain a cleaning solution wherein the cleaning solution is sprayed onto the surfaces to be cleaned to cover the surfaces. The surfaces are then rinsed thoroughly to remove the cleaning solution from the surfaces. This is important because the cleaning solution may be caustic in nature. Unfortunately, however, these cleaning steps require multiple apparatus thereby requiring the cleaning person to carry large amounts of cleaning supplies, such as cleaning solution, cleaning solution dispenser, and a water container with enough water for rinsing the surfaces being cleaned. Accordingly, this makes cleaning these areas laborious, time consuming and inefficient.

SUMMARY OF THE INVENTION

A portable shower cleaning article is provided and includes a first container, wherein the first container defines a first container cavity for containing a rinsing fluid, and a pump, wherein the pump is associated with the first container cavity. The portable shower cleaning article further includes a dispensing hose, wherein the dispensing hose includes a hose input end communicated with a hose output end via a hose cavity, a trigger valve, wherein the trigger valve is associated with the hose output end and defines a trigger valve input end communicated with a trigger valve output end via a trigger valve flow cavity and a second container, wherein the second container is removably associated with the trigger valve output end and defines a second container cavity for containing a cleaning fluid. Additionally, the portable shower cleaning article also includes a dispensing nozzle, wherein the dispensing nozzle is associated with the second container and in flow communication with the second container cavity, wherein the pump is configured to pump the rinsing fluid through the hose cavity, through the trigger valve flow cavity, into the second container cavity and out of the dispensing nozzle under a flow pressure.

A portable shower cleaning article is provided and includes a first container, wherein the first container defines a first container cavity for containing a rinsing fluid and a pump, wherein the pump is associated with the first container cavity. The portable shower cleaning article further includes a dispensing hose, wherein the dispensing hose includes a hose input end communicated with a hose output end via a hose cavity and a trigger valve, wherein the trigger valve is associated with the hose output end and defines a trigger valve input end communicated with a trigger valve output end via a trigger valve flow cavity, wherein the hose input end is associated with the pump, and wherein the pump is configured to pump the rinsing fluid through the hose cavity and into the trigger valve flow cavity.

A method for implementing a portable shower cleaning article is provided wherein the portable cleaning article includes a first container having a first container cavity for containing a liquid, a pump associated with the first container cavity, a dispensing hose associated with the pump and a trigger valve associated with the dispensing hose. The method includes filling the first container cavity with a liquid, associating a second container with the trigger valve, wherein the second container defines a second container cavity for containing a cleaning fluid and includes a dispensing nozzle, operating the pump to cause the liquid to flow out of the first container cavity, through the dispensing hose and into the trigger valve, operating the trigger valve to cause the liquid to flow out of the trigger valve, into the second container cavity to mix with the cleaning fluid and out of the dispensing nozzle, disassociating the second container from the trigger valve and operating the trigger valve to cause the liquid to flow out of the trigger valve.

BRIEF DESCRIPTION OF THE DRAWINGS

The foregoing and other features and advantages of the present invention will be better understood from the following detailed description of illustrative embodiments, taken in conjunction with the accompanying drawings in which.

DETAILED DESCRIPTION OF THE INVENTION

Figure 1A:
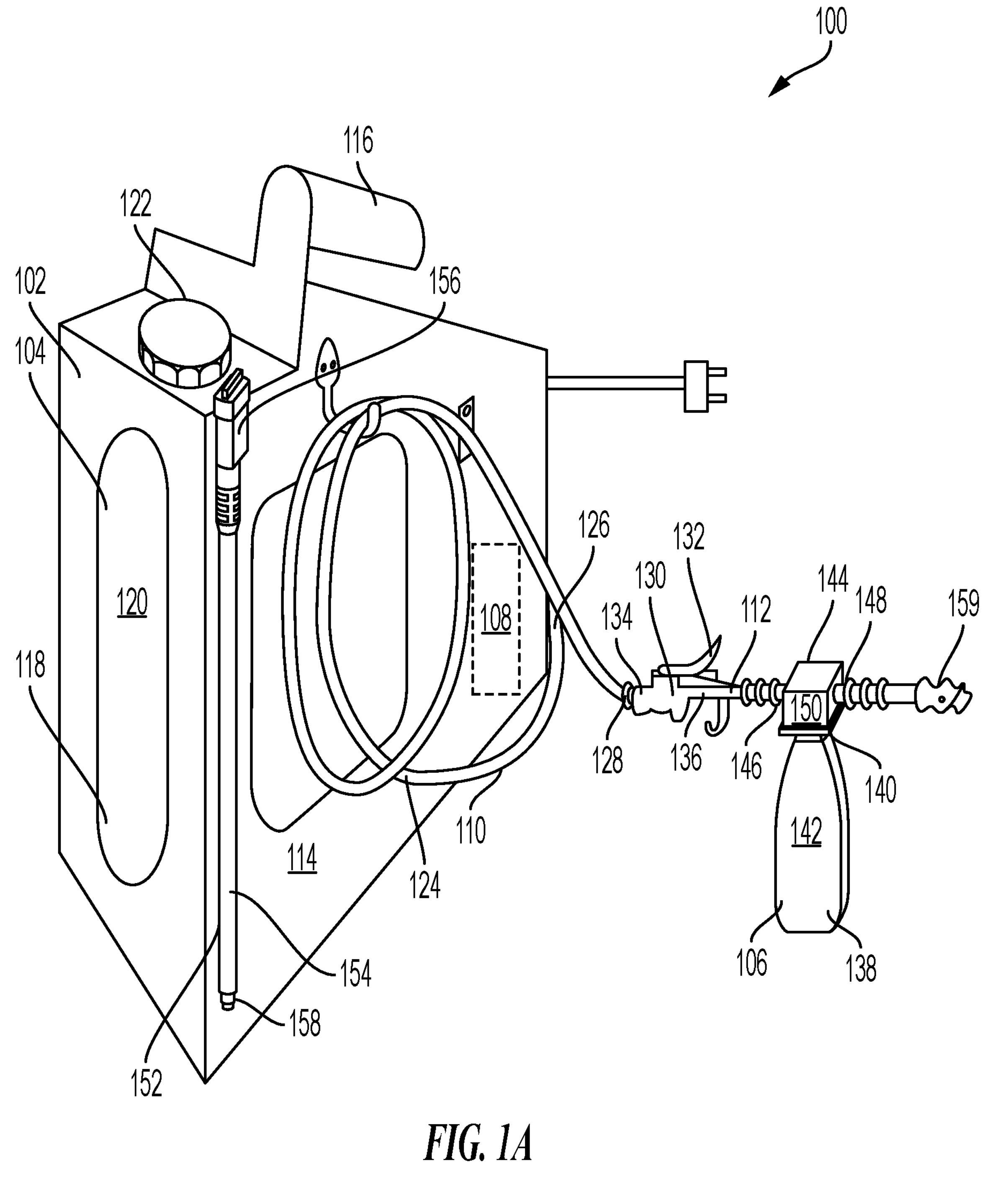
FIG. 1A is a front, side perspective view of a portable lightweight cleaning device, in accordance with one embodiment of the invention.

Referring to FIG. 1A, a portable lightweight cleaning device 100 is provided, wherein the cleaning device 100 includes a device cabinet 102, a first container 104, a second container 106, a pump 108, a dispensing hose 110 and a trigger valve 112, in accordance with one embodiment of the present invention. The device cabinet 102 is preferably constructed from a strong material or plurality of materials, such as metal, composite, and/or plastic, and defines a device cabinet cavity 114 for containing the first container 104 and the pump 108. Additionally, the device cabinet 102 defines a handle 116 to allow a user to carry the device cabinet 102 as needed. The first container 104 includes a first container structure 118 which defines a first container cavity 120 for containing a fluid, such as water. Additionally, the first container structure 118 defines a container opening 122 which is communicated with the first container cavity 120. This advantageously allows the first container 104 to be refilled with fluid via the container opening 122. Moreover, the dispensing hose 110 defines a hose cavity 124 and includes a hose pump end 126 and a hose dispensing end 128, wherein the hose pump end 126 is in flow communication with the hose dispensing end 128 via the hose cavity 124.

The pump 108 is associated with the first container 104 and the hose pump end 126 of the dispensing hose 110 such that when the pump 108 is operated, the pump 108 causes the fluid contained within the first container cavity 120 to flow into the hose pump end 126, through the hose cavity 124 and out of the hose dispensing end 128. It should be appreciated that the hose dispensing end 128 of the dispensing hose 110 is configured to associate with the trigger valve 112 to control the flow of the fluid flowing through the hose cavity 124. It should be appreciated that the trigger valve 112 defines a trigger valve flow cavity 130 and includes a trigger valve flow actuator 132, a trigger valve input end 134 and a trigger valve output end 136, wherein the trigger valve input end 134 is in flow communication with the trigger valve output end 136 via the trigger valve flow cavity 130. It should be appreciated that the flow of the fluid through the trigger valve 112 is controlled by the user via the trigger valve flow actuator 132.

It should be appreciated that the second container 106 includes a second container structure 138 which defines a second container opening 140 and a second container cavity 142 for holding a cleaning fluid/solution, wherein the second container opening 140 is communicated with the second container cavity 142. The second container 106 further includes a second container cover 144 which is configured to securely associate with the second container 106 to enclose the second container cavity 142. The second container cover 144 defines a second container cover input port 146, a second container cover output port 148 and a second container cover flow cavity 150, wherein the second container cover input port 146 is in flow communication with the second container cover output port 148 via the second container cover flow cavity 150. It should be appreciated that the second container cover input port 146 is configured to securely associate with the trigger valve output end 136 such that fluid flowing out of the trigger valve output end 136 will flow into the second container cover input port 146. Additionally, the second container cover flow cavity 150 is preferably associated with the second container cavity 142 such that fluid flowing into the second container cover flow cavity 150 will associate with a cleaning fluid/solution contained within the second container cavity 142 and then flow out of the second container cover output port 148.

Accordingly, the cleaning device 100 is operated as follows. Water (or other fluid as desired) is located within the first container cavity 120 and the container opening 122 is securely closed to seal the water therein. A cleaning fluid/solution is located within the second container cavity 142 and the second container 106 is associated with the dispensing hose 110. This may be accomplished by associating the second container cover input port 146 of the second container cover 144 with the trigger valve output end 136. This association may be facilitated via any method or device desired, suitable to the desired end purpose, such as a quick disconnect fitting. The pump 108 is operated to cause the water contained within the first container cavity 120 to flow through the dispensing hose 108 at a pressure of approximately 60 psi. The trigger valve 112 is then operated to cause the water to flow into the second container cavity 142 to mix with the cleaning fluid/solution and to flow out of the second container cover output port 148 in a pressurized stream and onto the surfaces to be cleaned. Once the second container cavity 142 is empty or all of the surfaces to be cleaned are sprayed with cleaning solution, the second container 106 is disassociated from the trigger valve 112. The trigger valve 112 is then operated to cause the water contained within the first container cavity 120 to flow through the dispensing hose 110 and out of the trigger valve output end 136 at a pressure of approximately 60 psi to rinse the surfaces that were covered with cleaning fluid/solution. It is contemplated that the pump may be configured to generate a flow pressure in the range of between approximately 50 psi (±10%) and 120 psi (±10%) as desired. Moreover, it should be appreciated that the flow pressure may be adjustable via at least one of the pump 108 and/or the trigger valve 112.

It should be appreciated that the cleaning device 100 may also include a spray wand 152 which is configured to associate with the second container cover output port 148 to allow a user to spray areas that are hard to reach or that may need a wider fluid stream spray. It is contemplated that the spray wand 152 may define a spray wand flow cavity 154 and may include a spray wand input port 156 and a spray wand output port 158, wherein the spray wand input port 156 is in flow communication with the spray wand output port 158 via the spray wand flow cavity 154. Moreover, it is contemplated that the spray wand input port 154 is configured to easily associate with at least one of the trigger valve output end 136 and/or the second container 106 via any method or device desired, suitable to the desired end purpose, such as a quick disconnect fitting. Additionally, the cleaning device 100 may include a cleaning fluid dispensing nozzle 159 which is communicated with the second container 164 to dispense the cleaning fluid/solution/chemical. This dispensing nozzle 159 may be configured to allow/cause the water-cleaning fluid/solution/chemical mix to foam up and be dispensed wholly and/or partially as a cleaning foam.

Figure 1B:
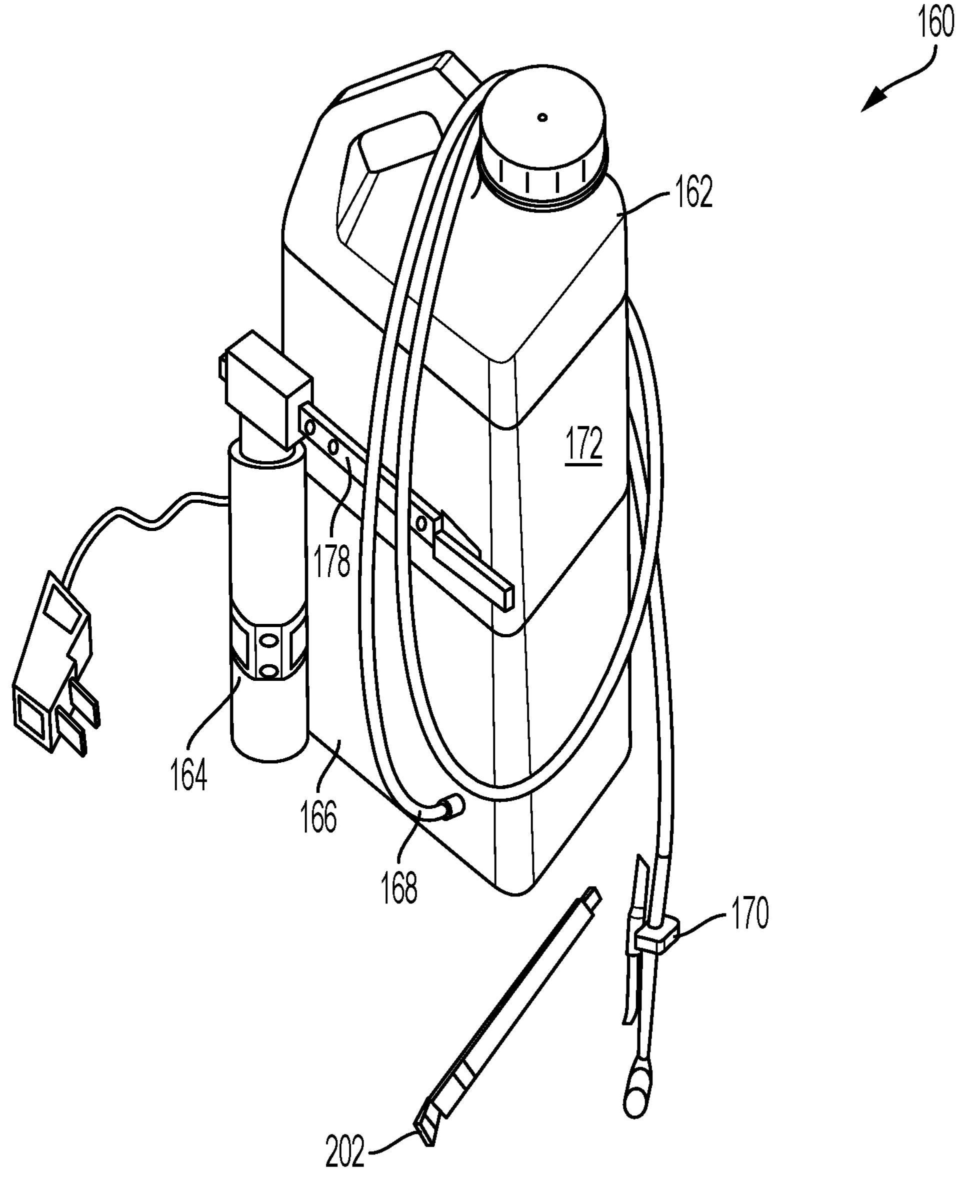
FIG. 1B is a front, side perspective view of a portable lightweight cleaning device, in accordance with one embodiment of the invention.

Moreover, it should be further appreciated that the pump 108 may be a manually operated pump (i.e., hand pump) or an electrically operated pump 108 in which case the pump 108 may include a and/or electronics/power cord to connect to an external power source (such as a wall plug). It is contemplated that in other embodiments, a battery may be used to power the pump. Furthermore, it is contemplated that the first container 104 and/or the second container 106 of the cleaning device 100 may be any size desired, suitable to the desired end purpose. For example, in the embodiment shown in FIG. 1A, the cleaning device 100 is configured to have a first container cavity 120 of one (1)-five (5) gallons and thus may be carried (either by hand or via backpack configuration) by the user. Moreover, in still yet another embodiment and referring to FIG. 1B, a cleaning device 160 having a first container 162, a second container 164, a pump 166, a dispensing hose 168, a trigger valve 170 and a dispensing nozzle 172 is shown, wherein the first container 162 defines a first container cavity 174 having a volume of one (1)-two (2) gallons is provided and wherein the second container 164 defines a second container cavity 175 having a volume of approximately 32 oz (volume range may be between 8 oz and 64 oz as desired). This embodiment advantageously allows a user to more easily use the cleaning device 160 than the other embodiments which have a larger volume capacity. As with the other embodiments, the cleaning device 160 may further include a spray wand 176 which is configured to associate with the second container 164 and/or the trigger valve 170 to allow a user to spray areas that are hard to reach or that may need a wider fluid stream spray.

Figure 2:
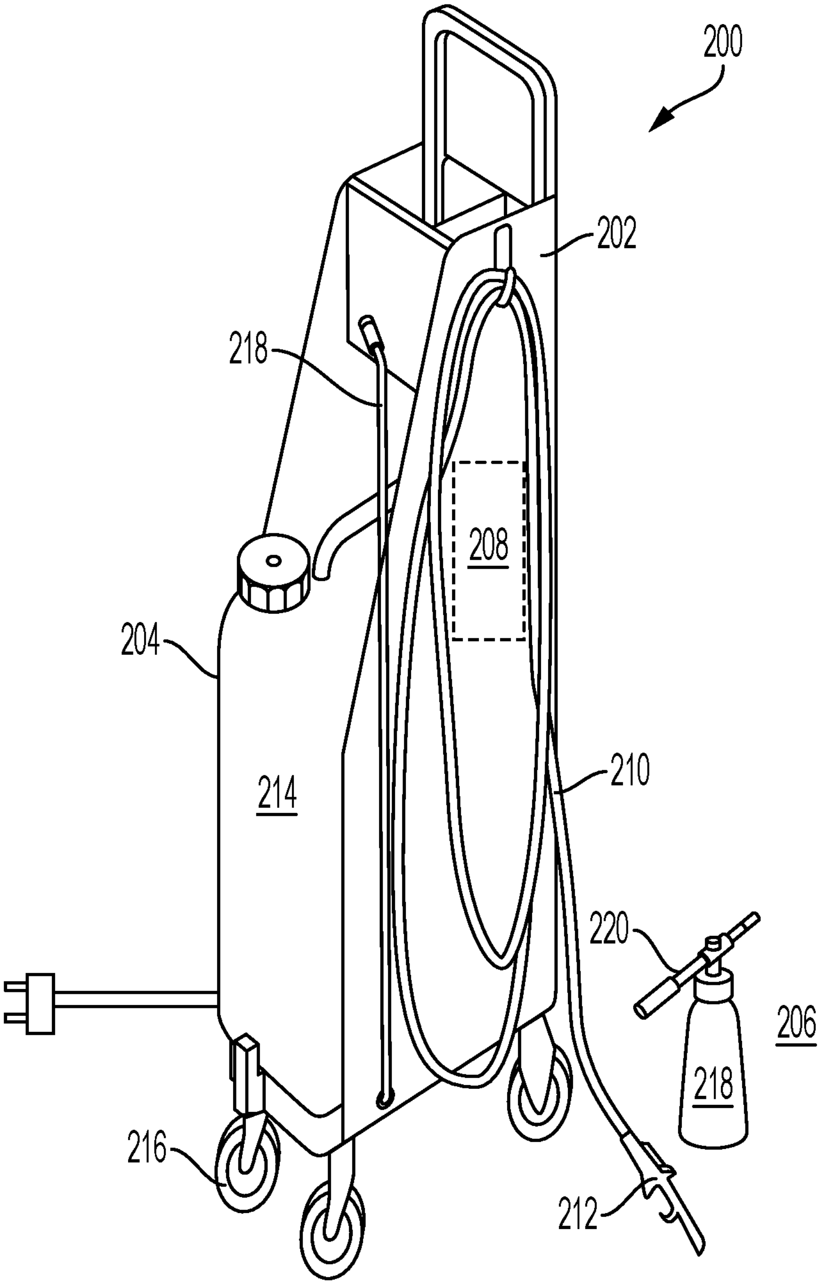
FIG. 2 is a front, side perspective view of a portable lightweight cleaning device, in accordance with another embodiment of the invention.
Figure 3:
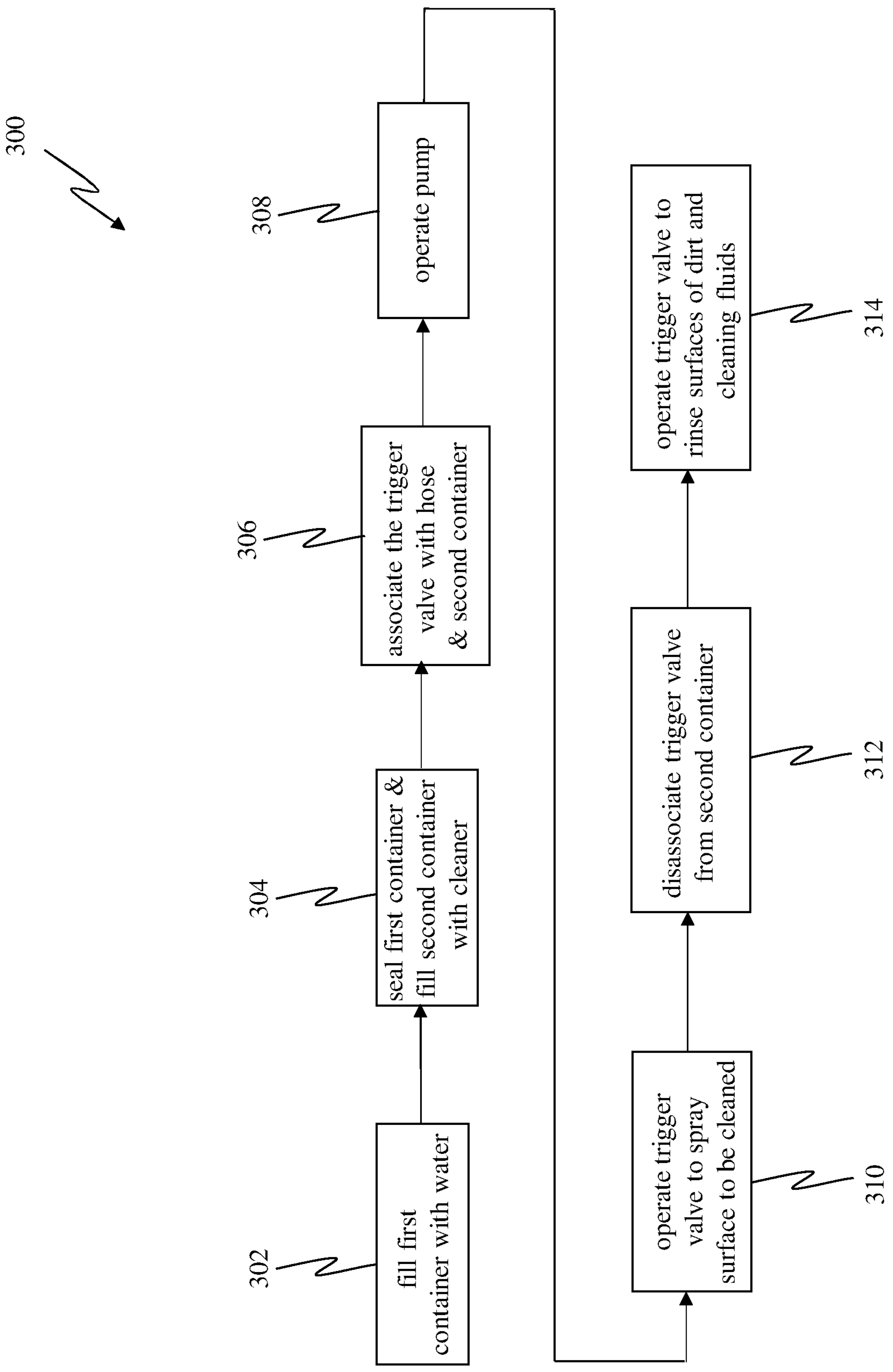
FIG. 3 is an operational block diagram illustrating a method for operating the cleaning device of FIG. 1A, FIG. 1B and FIG. 2, in accordance with one embodiment of the invention.

Additionally, the cleaning device 160 may include a cleaning fluid dispensing nozzle 178 which is communicated with the second container 164 to dispense the cleaning fluid/solution/chemical. This dispensing nozzle 178 may be configured to allow/cause the water-cleaning fluid/solution/chemical mix to foam up and be dispensed wholly and/or partially as a cleaning foam. It should be appreciated that in one embodiment, the pump 108 may be a 100 psi Shurflo on-demand pump with a 1.4 gallon per minute capacity. While in another embodiment, the pump 108 may be a 85-110 psi, 3-amp D.C. on-demand pump. Moreover, it should be appreciated that in one embodiment, the dispensing nozzle 178 may include an adjustable feed capability having of one or more gallons per minute, such as for example, 1, 2, 4, 6, and 12 oz. per gallon options.

referring to FIG. 2, a cleaning device 200 is shown having a device cabinet 202, a first container 204, a second container 206, a pump 208, a dispensing hose 210 and a trigger valve 212, in accordance with another embodiment of the present invention. It should be appreciated that in this embodiment, the first container 202 includes a first container cavity 214 having a capacity of five (5) or more gallons. In this embodiment, the cleaning device is too heavy to be easily carried by a user so the device cabinet 202 includes wheels 216 to allow a user to move the cleaning device 202 as needed. It should be appreciated that the second container 106, 206 may have a second container cavity 142, 218 with a capacity as desired suitable to the desired end purpose, such as for example 32 oz. It is contemplated that the second container 106, 206 should not be too heavy for a user to hold and operate with one hand. As with the other embodiments, the cleaning device 200 may further include a spray wand 218 which is configured to associate with the second container 206 and/or the trigger valve 212 to allow a user to spray areas that are hard to reach or that may need a wider fluid stream spray. Additionally, the cleaning device 200 may include a cleaning fluid dispensing nozzle 220 which is communicated with the second container 164 to dispense the cleaning fluid/solution/chemical. This dispensing nozzle 220 may be configured to allow/cause the water-cleaning fluid/solution/chemical mix to foam up and be dispensed wholly and/or partially as a cleaning foam. It should be appreciated that the spray wand 218 may be between 6-12 inches long having a jetted tip.

It should be appreciated that in still yet other embodiments, the invention may include a first container 104, 162, 204 which includes a hose container inlet 500 which is configured to connect to a hose that may be further connected to a water source, such as a sink outlet. This would advantageously allow a user to use the cleaning device 100, 160, 200 while having the first container 104, 162, 204 being constantly filled with water.

In accordance with one embodiment of the invention, a method 300 for operating the cleaning device 100, 200 is provided and includes filling the first container 104, 204 with water or other rinsing fluid, as shown in operational block 302. The first container 104, 204 may then be sealed and the second container 106, 206 may then be filled with a cleaning fluid/solution/chemical, as shown in operational block 304. This may be accomplished by removing the second container cover 144, disposing the cleaning fluid/solution/chemical into the second container cavity 142, 218 and associating the second container cover 144 with the second container 106, 206 to securely cover the second container opening 140 and enclose the second container cavity 142, 218. The trigger valve input end 134 is securely associated with the hose dispensing end 128 and the trigger valve output end 136 is securely associated with the second container cover input port 146, as shown in operational block 306. The pump 108, 208 is then operated to cause the water contained within the first container cavity 120, 214 to flow through dispensing hose 110, 210 and into the trigger valve 112, 212 under pressure, as shown in operational block 308.

The trigger valve 112, 212 is then operated to cause the water contained within the dispensing hose 110, 210 and the trigger valve 112, 212 to flow into the second container cavity 142, 218 to mix with the cleaning fluid/solution/chemical within the second container cavity 142, 218 and flow out of the second container cover output port 148 in a pressurized stream and onto the surfaces to be cleaned, as shown in operational block 310. The cleaning fluid/solution/chemical may be left on the surfaces to be cleaned to allow the cleaning fluid/solution/chemical to soak on the surfaces and interact with the dirt/grease/germs and/or the cleaning fluid/solution/chemical may be agitated by scrubbing/rubbing the cleaning fluid/solution/chemical on and/or into the surfaces being cleaned. The second container 106, 206 is then disassociated from the trigger valve output end 136, as shown in operational block 312, and the trigger valve 112, 212 is operated to cause the water/rinsing fluid located within the first container cavity 120, 214 to flow out of the trigger valve output end 136 under pressure, as shown in operational block 314, to rinse the surfaces that were covered with the cleaning fluid/solution/chemical from any residue from the cleaning fluid/solution/chemical. If the first container cavity 120, 214 is depleted or low on water/rinsing fluid, more water/rinsing should be added.

It should be appreciated that one advantageous feature of this invention is that the cleaning device 100, 200 generally uses a pressure of approximately 60 psi. Accordingly, the pressure allows for the cleaning fluid/solution/chemical to be disbursed adequately to clean surfaces but is not large enough to cause over spray and/or damage the structure being cleaned. Essentially, when the water from the first container cavity 120, 214 interacts with the cleaning fluid/solution/chemical contained within the second container cavity 142, 218 it mixes with air and foaming occurs. The foam is then diffused through the nozzle.

Moreover, while the invention has been described with reference to an exemplary embodiment, it will be understood by those skilled in the art that various changes, omissions and/or additions may be made, and equivalents may be substituted for elements thereof without departing from the spirit and scope of the invention. In addition, the elements and characteristics of the disclosed embodiments may be combined in whole or in part and/or many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A portable shower cleaning article, comprising:

a first container, wherein the first container defines a first container cavity for containing a rinsing fluid;

a pump, wherein the pump is associated with the first container cavity;

a dispensing hose, wherein the dispensing hose includes a hose input end communicated with a hose output end via a hose cavity;

a trigger valve, wherein the trigger valve is associated with the hose output end and defines a trigger valve input end communicated with a trigger valve output end via a trigger valve flow cavity;

a second container, wherein the second container is removably associated with the trigger valve output end and defines a second container cavity for containing a cleaning fluid; and a dispensing nozzle, wherein the dispensing nozzle is associated with the second container and in flow communication with the second container cavity;

wherein the pump is configured to pump the rinsing fluid through the hose cavity, through the trigger valve flow cavity, into the second container cavity and out of the dispensing nozzle under a flow pressure.

2. The portable shower cleaning article of claim 1, wherein the rinsing fluid is water.

3. The portable shower cleaning article of claim 1, wherein the hose input end is associated with the pump and wherein the hose output end is associated with the trigger valve input end.

4. The portable shower cleaning article of claim 1, wherein the pump is configured to pump the rinsing fluid out of the first container cavity and into the hose input end.

5. The portable shower cleaning article of claim 1, wherein the trigger valve further includes a trigger valve actuator which is configured to control the flow of the rinsing fluid through the trigger valve flow cavity.

6. The portable shower cleaning article of claim 1, wherein the second container is removably associated with the trigger valve output end via a quick disconnect device.

7. The portable shower cleaning article of claim 1, wherein the dispensing nozzle is configured to cause the combination of the rinsing fluid and the cleaning fluid to foam up upon being dispensed from the dispensing nozzle.

8. The portable shower cleaning article of claim 1, further comprising a spray wand, wherein the spray wand is configured to be removably associated with the trigger valve output end via a quick disconnect device.

9. The portable shower cleaning article of claim 1, wherein the pump is configured to generate a flow pressure of between 80 psi and 110 psi.

10. A portable shower cleaning article, comprising:

a first container, wherein the first container defines a first container cavity for containing a rinsing fluid;

a pump, wherein the pump is associated with the first container cavity;

a dispensing hose, wherein the dispensing hose includes a hose input end communicated with a hose output end via a hose cavity; and a trigger valve configured to operatively associate with a second container, wherein the trigger valve is associated with the hose output end and defines a trigger valve input end communicated with a trigger valve output end via a trigger valve flow cavity, wherein the hose input end is associated with the pump, wherein the pump is configured to pump the rinsing fluid through the hose cavity and into the trigger valve flow cavity, and wherein when the trigger valve is associated with the second container, the second container receives at least a portion of the rinsing fluid flowing out of the trigger valve output end.

11. The portable shower cleaning article of claim 10, further comprising a dispensing nozzle, wherein the second container is removably associated with the trigger valve output end and defines a second container cavity for containing a cleaning fluid, and wherein the dispensing nozzle is associated with the second container and is in flow communication with the second container cavity.

12. The portable shower cleaning article of claim 11, wherein the pump is configured to pump the rinsing fluid through the hose cavity, through the trigger valve flow cavity, into the second container cavity and out of the dispensing nozzle under a flow pressure.

13. The portable shower cleaning article of claim 11, wherein the second container is removably associated with the trigger valve output end via a quick disconnect device, and wherein the dispensing nozzle is configured to cause the combination of the rinsing fluid and the cleaning fluid to foam up upon being dispensed from the dispensing nozzle.

14. The portable shower cleaning article of claim 10, wherein the hose input end is associated with the pump and wherein the hose output end is associated with the trigger valve input end, and wherein the pump is configured to generate a flow pressure of between 80 psi and 110 psi.

15. The portable shower cleaning article of claim 10, wherein the pump is configured to controllably pump the rinsing fluid out of the first container cavity and into the hose input end.

16. The portable shower cleaning article of claim 10, wherein the trigger valve further includes a trigger valve actuator which is configured to control the flow of the rinsing fluid through the trigger valve flow cavity.

17. The portable shower cleaning article of claim 10, further comprising a spray wand, wherein the spray wand is configured to be removably associated with the trigger valve output end via a quick disconnect device.

18. A method for implementing a portable shower cleaning article, wherein the portable cleaning article includes a first container having a first container cavity for containing a liquid, a pump associated with the first container cavity, a dispensing hose associated with the pump and a trigger valve associated with the dispensing hose, the method comprising:

filling the first container cavity with a liquid;

associating a second container with the trigger valve, wherein the second container defines a second container cavity for containing a cleaning fluid and includes a dispensing nozzle;

operating the pump to cause the liquid to flow out of the first container cavity, through the dispensing hose and into the trigger valve;

operating the trigger valve to cause the liquid to flow out of the trigger valve, into the second container cavity to mix with the cleaning fluid and out of the dispensing nozzle;

disassociating the second container from the trigger valve; and operating the trigger valve to cause the liquid to flow out of the trigger valve.

19. The method of claim 18, wherein the pump includes a power switch and a power cord and wherein operating the pump includes connecting the power cord to a power source and configuring the power switch into the on position, and wherein the trigger valve includes an actuator, wherein operating the trigger valve includes engaging the actuator to cause the fluid to flow out of the trigger valve.

20. The method of claim 18, wherein the portable shower cleaning article further includes a spray wand, wherein operating the trigger valve includes connecting the spray wand to the trigger valve and operating the trigger valve to cause the liquid to flow out of the spray wand under pressure.

* * * * *